United States Patent [19]

Vogt et al.

[11] Patent Number: 4,768,277

[45] Date of Patent: Sep. 6, 1988

[54] METHOD OF MOUNTING A VEHICLE DOOR

[75] Inventors: Hans Vogt, Overath; Martin Ufrecht, Cologne, both of Fed. Rep. of Germany

[73] Assignee: Ford Motor Company, Dearborn, Mich.

[21] Appl. No.: 941,013

[22] Filed: Dec. 12, 1986

Related U.S. Application Data

[60] Division of Ser. No. 837,873, Mar. 4, 1986, abandoned, which is a continuation of Ser. No. 663,521, Oct. 22, 1984, abandoned.

[30] Foreign Application Priority Data

Nov. 10, 1983 [DE] Fed. Rep. of Germany ....... 3340634

[51] Int. Cl.[4] .............................................. F16B 11/00

[52] U.S. Cl. .......................................... 29/434; 29/11; 29/429; 29/527.1

[58] Field of Search ...................... 16/382, 384; 29/11, 29/83 K, 430, 434, 445, 460, 464, 527.1, 530, 703, 709, 711, 712, 783, 786, 787, 793, 794, 822, 823, 824; 156/81, 243; 264/261, 262; 403/265, 268

[56] References Cited

U.S. PATENT DOCUMENTS

| | | | |
|---|---|---|---|
| 4,063,528 | 12/1977 | Fischer | 264/262 X |
| 4,375,716 | 3/1983 | Armstrong et al. | 29/434 X |

FOREIGN PATENT DOCUMENTS

| | | | |
|---|---|---|---|
| 2540856 | 9/1982 | Fed. Rep. of Germany . | |
| 8121361 | 5/1983 | France | 16/384 |
| 52-76 | 1/1979 | Japan | 29/464 |
| 6503291 | 9/1965 | Netherlands | 16/389 |

*Primary Examiner*—P. W. Echols
*Assistant Examiner*—Andrew E. Rawlins
*Attorney, Agent, or Firm*—Daniel M. Stock; Clifford L. Sadler

[57] ABSTRACT

In a method for the preliminary and/or final mounting of a vehicle door on a part of the bodywork by means of a hinge comprising two stop members, the following method steps are carried out: (a) fastening one hinge member 5 of the hinge to part of the bodywork 2; (b) fastening the other hinge member 7 to the door 3; (c) hanging the vehicle door by plugging the pin 7 on one hinge member into the socket 15 on the other hinge member and aligning the vehicle door with respect to the opening in the bodyshell using a jig; and (d) injecting a hardening plastic substance 18 into the socket surrounding the pin and subsequently sealing the injection opening.

2 Claims, 2 Drawing Sheets

METHOD OF MOUNTING A VEHICLE DOOR

This is a division of application Ser. No. 837,873, filed Mar. 4, 1986, now abandoned, which is a continuation of application Ser. No. 663,521, filed Oct. 22, 1984, now abandoned.

BACKGROUND OF THE INVENTION

1. Field of Invention

The invention relates to a method for the preliminary and final mounting of a vehicle door and to a vehicle door hinge assembly for effecting such mounting.

2. Description of the Prior Art

Conventionally, the vehicle doors are secured to the body shell of a vehicle by means of two hinges comprising hinge plates or leaves which are secured to the body shell by welding or screw-fastening the plates.

It has been usual to realign the doors by using large lever arms which lead to deformation of the parts of the body adjacent to the hinge plates, to produce an alignment of the vehicle door with respect to the bodywork opening. With this procedure, undesired stresses and springing back must be accounted for.

The bodywork is altered by the subsequent manufacturing processes, such as the painting process and the final assembly, so that eventually the alignment of the vehicle door with respect to the bodywork opening may no longer be true.

The alignment of a vehicle door with respect to the bodywork opening receiving it becomes even more difficult if the vehicle door has to be removed from the bodywork for the purpose of passing it through a separate painting process and a separate assembly line. In this case alignment of the vehicle door with respect to the bodywork opening has been possible only with expensive, adjustable hinges as disclosed, for example, in the German Offenlegungsschrift (Laid-Open Specification) No. 29 37 166.

A method and an apparatus for the preliminary and/or final mounting of a vehicle door is already known from the German Pat. No. 25 40 856, in which deformable intermediate layers which determine a first position of the vehicle door during the preliminary mounting of the door are arranged on the body shell between the shell and the plates of the hinge. After this preliminary mounting, the body shell together with the vehicle door passes through the entire painting process and the final assembly; and the final mounting, which determines the final position of the door, is then carried out by the application of a greater screwing force.

This known method and this apparatus have the disadvantage that only a limited tolerance compensation, determined by the deformable intermediate layers, is possible.

The invention seeks to find a method and a hinge assembly for the preliminary and/or final mounting of a vehicle door which will make possible the bridging of even more greatly different tolerance positions in a simple manner.

European Patent Publication No. 0 007 177 and German Offenlegungsschrift No. 11 09 047 disclose an idea wherein, in order to mount a vehicle door, hinges comprising hinge plates are aligned by way of stop surfaces or holding devices and are secured in a cavity in the vehicle door by being set in a foam.

In the case of these two known publicaticns, mention is only made in each case of the mounting of the corresponding hinge members on the vehicle door, whereas the fastening of the other hinge members or plates of the hinge must be carried out in known manner on the body shell opening. Consequently, undesired divergencies between the contour of the vehicle door and the contour of the bodywork can again arise.

SUMMARY OF THE INVENTION

According to the invention, there is provided a method for the preliminary and final mounting of a vehicle door on a vehicle bodyshell by means of hinges which each have two hinge members, one of the members having a projecting pin and the other member having a socket for receiving the pin, characterized by the following method steps: (a) fastening one hinge member of the hinge to part of the bodywork; (b) fastening the other hinge member to the door; (c) hanging the vehicle door by plugging the pin on one hinge member into the socket on the other hinge member; (d) removing the vehicle door after the entire bodyshell has passed through the painting process and carrying out the assembly of the bodywork and vehicle door separately; (e) hanging the vehicle door by plugging the pin on one hinge member into the socket on the other hinge member and aligning the vehicle door with respect to the opening in the bodyshell using a jig; and (f) injecting a hardening plastic substance into the socket surrounding the pin and subsequently sealing the injection opening. This method can be used when the vehicle doors are painted at the same time as the rest of the bodyshell.

The invention also provides a method for the final mounting of a vehicle door on a vehicle bodyshell by means of hinges which each have two hinge members, one of the members having a projecting pin and the other member having a socket for receiving the pin, characterized by the following method steps: (a) fastening one hinge member of the hinge to part of the bodywork; (b) fastening the other hinge member to the door; (c) hanging the vehicle door by plugging the pin on one hinge member into the socket on the other hinge member and aligning the vehicle door with respect to the opening in the bodyshell using a jig; and (d) injecting a hardening plastics substance into the socket surrounding the pin and subsequently sealing the injection opening.

This method can be used when the vehicle doors are painted separately from the bodyshell; for example, when they are composed partly of plastics material and require a different painting process, or possibly no painting at all.

The invention further provides a vehicle door hinge comprising two hinge members, one member including a projecting pin and the other member including a socket adapted to receive the pin, the pin being formed with notches or grooves in its surface and the socket having a socket mouth which seals around the pin, the rest of the socket being of such a size that when the pin is inserted in the socket, a cavity exists around the pin to receive a settable substance which can be injected into the cavity to set around the pin and to lock the pin in position in the socket.

With the methods set out above, a trouble-free alignment of the vehicle door with its bodywork opening is ensured, it being possible to bridge even substantial tolerances.

By virtue of the fact that one stop or hinge member of the hinge is formed in known manner as a screw-on or weld-on plate and the other stop or hinge member is formed as a setting plug or pin with a plurality of notches and there is secured to the vehirle door a holding plate which is provided with a setting bore or socket and behind which is formed a cavity of limited volume, this hinge arrangement may first of all be used for the preliminary mounting of the vehicle door in conjunction with possible auxiliary devices for the passage of the entire bodywork through the painting process. After this, the bodywork and the vehicle door may be completed on separate assembly lines and the same hinge arrangement may be used for the final mounting of the vehicle door in a position aligned without difficulty as the cavity is filled up with the hardening plastic mass.

In the same way, in the case of a vehicle door which consists partially or entirely of plastics material, the preliminary mounting for the purpose of passing the entire bodywork through the painting process may be dispensed with. The vehicle door produced separately is set on the setting plug by means of the setting bore in the holding plate and the cavity formed behind is filled with the hardening plastic mass. In this connection, the setting bore largely prevents an escape of the plastics mass by means of the rear section of the setting plug.

In addition, a resilient protection disc may be placed at the foot of the setting plug in order tc avoid damage to the paint during alignment and in order to catch any possible escape of the hardening plastic mass.

The cavity with limited volume is preferably formed by sleeve-shaped sheet metal parts which are provided at their free end with an injection funnel which may be pinched off after the insertion of the hardening plastic mass.

BRIEF DESCRIPTION OF THE DRAWINGS

The invention is described in greater detail with reference to one example of embodiment illustrated in the accompanying drawings, in which.

DESCRIPTION OF THE PREFERRED EMBODIMENTS

Figure 1:
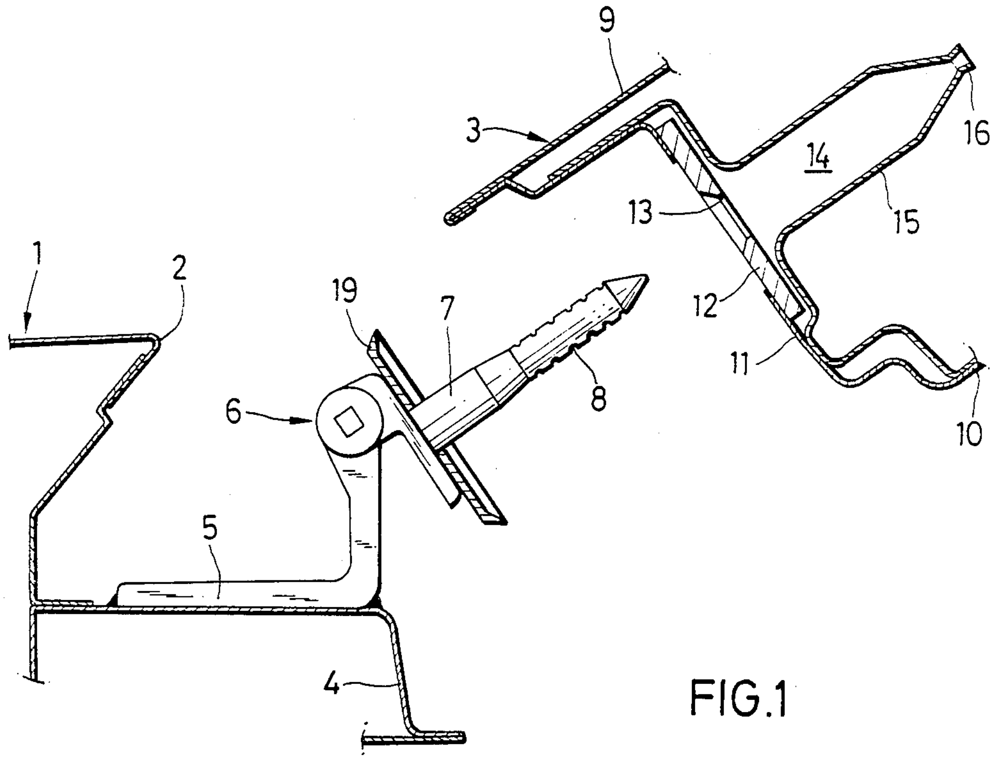
FIG. 1 is a plan view of a hinge assembly according to the invention before assembly.

The Figures show a door opening 2 which is formed in a vehicle body shell and in which a vehicle door 3 is to be pivotably mounted in alignment with the body shell surface surrounding it and with as uniform as possible a peripheral gap.

Part of the door opening 2 is formed by a door pillar 4 to which a hinge member of a hinge 6 in the form of a plate 5 may be secured in a known manner such as welding.

The other member of the hinge 6 is formed as a plug 7 which is formed with a plurality of notches or grooves 8.

The vehicle door 3 consists, in the conventional manner, of an outside door panel 9 and an inside door panel 10. An angled surface of the inside dcor panel 10 forms an end face of the vehicle door. On the end face 11 facing the door pillar 4 the vehicle door 3 is provided with a holding plate 12 in which a bore 13 is formed. Behind the holding plate 12 is a cavity 14 of limited volume which in the illustrated embodiment is formed by a sleeve-shaped sheet metal part 15. The holding plate 12 and the sheet metal part 15 are connected to the inner door panel 10 in a known manner, for example, by spot welding.

The method described for the preliminary and/or final mounting of a vehicle door permits preliminary mounting of the vehicle door without finally aligning the door if it is desired to mount the door for the passage of the bodyshell through the painting process and then to demount the door for subsequent assembly work.

After passing through the painting process the vehicle door may be removed; and, on a separate assembly line, it may be completed with the usual devices such as window regulators, window guides, lock-actuating devices and the like. As soon as the bodyshell and the vehicle door have each reached a suitable degree of completion, they are assembled together and the vehicle door is again set, by way of its holding plate 12, on the plug 7 of the hinge.

A framing jig which will not be described in detail, and which is not shown in the Figures, ensures that the vehicle door 3 is flush with the surrounding surface of the bodyshell 1 and that the size of the gap between the door and the door opening 2 the bodyshell is kept uniform. As soon as the vehicle door is aligned, an injection nozzle 17, which injects a hardening plastic mass 18 under suitable pressure, is applied to the sleeve-shaped sheet metal part 15 which is provided with an injection funnel 16 at its free end. This injection procedure is illustrated in FIG. 2.

After the cavity 14 has been completely filled by the plastic mass 18, a slight amount of the plastic mass 18 may possibly leak out through the bore 13. A resilient protection disc 19 at the foot of the plug 7 prevents the paintwork from being scratched during alignment and seals off possible residual escape of the plastic mass.

Figure 3:
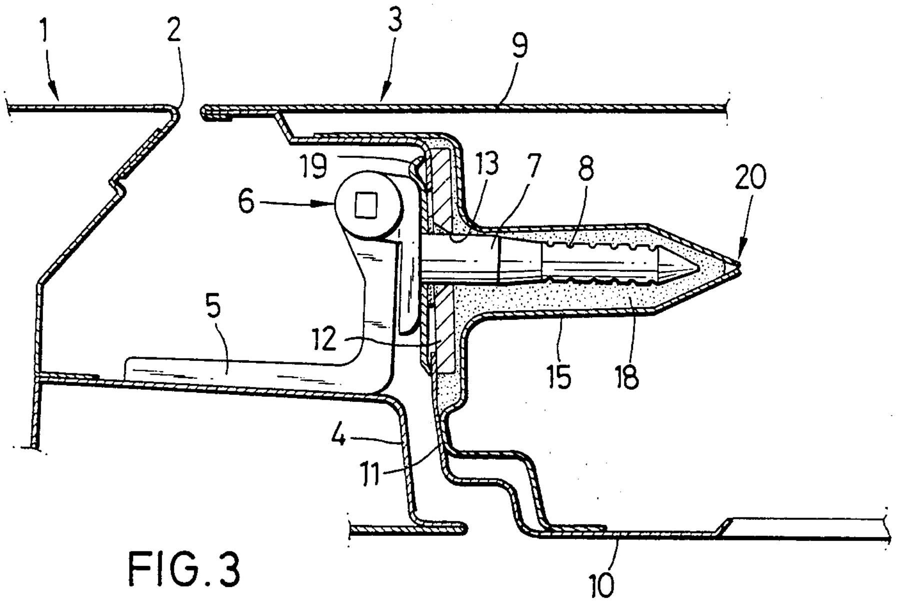
FIG. 3 shows the assembly according to FIG. 2 after the completion of the injection procedure.

As soon as the cavity 14 is completely filled with the plastic mass 18, the injection funnel, as shown at 20 in FIG. 3, is pinched off in order to prevent an escape of the plastic mass 18. The framing jig remains on the vehicle body until the appropriate hardening period of the plastic mass has elapsed.

Figure 2:
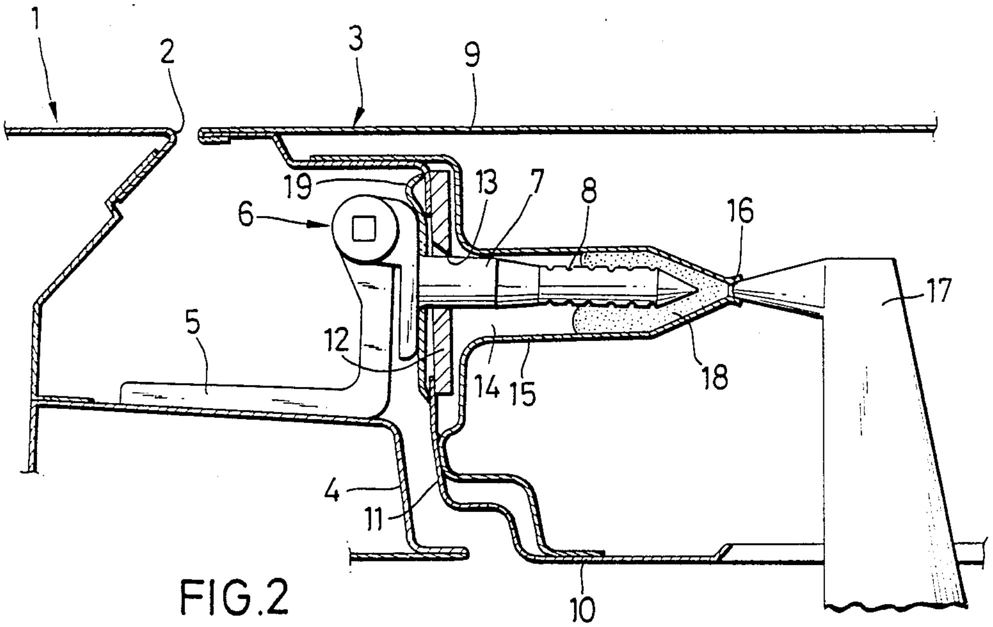
FIG. 2 shows a hinge assembly according to the invention during the procedure of the injection of the hardening plastic mass.

As is clearly shown in FIGS. 2 and 3, the axial alignment of the plug 7 may diverge considerably from the axial alignment of the sleeve-shaped sheet metal parts 15; but, nevertheless, the vehicle door 3 is finally mounted in an aligned and flush position with respect to the body 1 of the vehicle.

The relationship of the two different hinge members of the hinge 6 may also, of course, be reversed, i.e., the hinge member formed as a screw-on or weld-on plate 5 may be carried with the vehicle door and the hinge member formed as the plug 7 may be carried with the door pillar 4 which must then, of course, be provided with a suitable sheet metal part in order to form a cavity with limited volume for receiving the hardening plastic mass.

A separate sheet metal part for the cavity may, of course, be abolished if, for example, the vehicle door is constructed as a sandwich component, in the end face of which an appropriate cavity is formed in advance.

What is clasimed is:

1. A method for the final mounting of a vehicle door on a vehicle bodyshell by means of hinges which each have two hinge members, one of the members having a projecting pin and the other member having a socket for receiving the pin and an open injection funnel at one end characterized by the following steps:

(a) fastening one hinge member of the hinge to part of the bodywork;

(b) fastening the other hinge member to the door;

(c) hanging the vehicle door by plugging the pin on one hinge member into the socket on the other hinge member and aligning the vehicle door with respect to the opening in the bodyshel using a jig; and (d) injecting a hardening plastic substnace into the socket surronding the pin through the injection funnel and subsequently sealing the injection funnel opening.

2. A method for the preliminary and final mounting of a vehicle door on a vehicle bodyshell by means of hinges which each have two hinge members, one of the members having a projecting pin and the other member having a socket for receiving the pin and an open injection funnel at one end, characterized by the following steps:

(a) fastening one hinge member of the hinge to part of the bodywork;

(b) fastening the other hinge member to the door;

(c) hanging the vehicle door by plugging the pin on one hinge member into the socket on the other hinger member;

(d) painting the vehicle door and the vehicle bodyshell;

(e) removing the vehicle door after the entire painting step is complete and carrying out the assembly of the bodywork and vehicle door separately;

(f) hanging the vehicle door by plugging the pin on one hinge member into the socket on the other hinge member and aligning the vehicle door with respect to the opening in the bodyshell using a jig; and (g) injecting a hardening plastic substance into the socket surrounding the pin through the injection funnel and subsequently sealing the injection funnel opening.

* * * * *